W. R. CHILLCOTT.
MANUFACTURE OF CHAINS.
APPLICATION FILED JUNE 20, 1918.

1,299,300.

Patented Apr. 1, 1919.

WITNESSES
J. Herbert Bradley.
Lois Urnieman.

INVENTOR
William R. Chillcott
by W. F. Doolittle
Attorney

UNITED STATES PATENT OFFICE.

WILLIAM R. CHILLCOTT, OF PITTSBURGH, PENNSYLVANIA, ASSIGNOR, BY DIRECT AND MESNE ASSIGNMENTS, OF THREE-SIXTEENTHS TO WILLIAM MILLIGAN, THREE-SIXTEENTHS TO CHARLES W. GRAY, AND THREE-SIXTEENTHS TO DANIEL EVANS, ALL OF PITTSBURGH, PENNSYLVANIA.

MANUFACTURE OF CHAINS.

1,299,300.  Specification of Letters Patent.  Patented Apr. 1, 1919.

Original application filed February 14, 1918, Serial No. 217,172. Divided and this application filed June 20, 1918. Serial No 240,999.

*To all whom it may concern:*

Be it known that I, WILLIAM R. CHILLCOTT, a citizen of the United States, residing at Pittsburgh, in the county of Allegheny and State of Pennsylvania, have invented certain new and useful Improvements in the Manufacture of Chains, of which the following is a specification.

My invention relates to the manufacture of cast steel and welded link chains of the character set forth in the application for patent Serial No. 217,172, filed by me February 14, 1918, this application being a division thereof. The present invention more particularly relates to a link blank designed to be employed in the manufacture of cast steel and welded link chains.

The prime objects of the present invention are, to provide a chain link blank preferably made of cast steel and of such construction that it may be readily utilized in the manufacture of chains of the character specified. A further object is to produce a blank having separated curved overlapping end portions having opposing faces disposed so that the ends of the blank, after being heated, may be welded together by pressure applied to the sides of the separated end portions.

Figure 1:
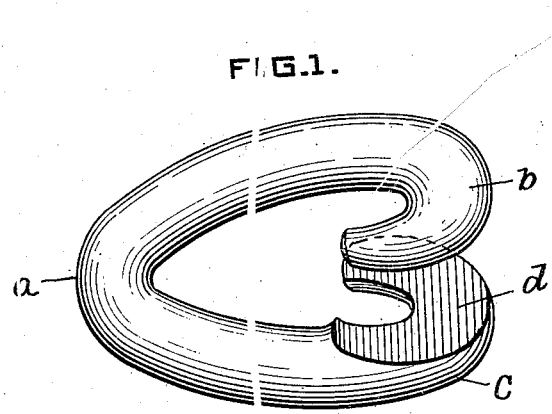
Figure 2:
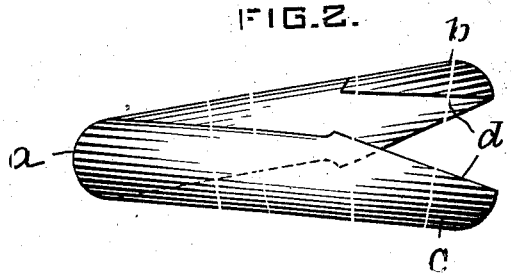

In the accompanying drawings, which illustrate link blanks embodying my invention, Figure 1 is a perspective view of a blank made in accordance with my invention;

Fig. 2, a side elevational view of the form of Fig. 1; and

Figure 3:
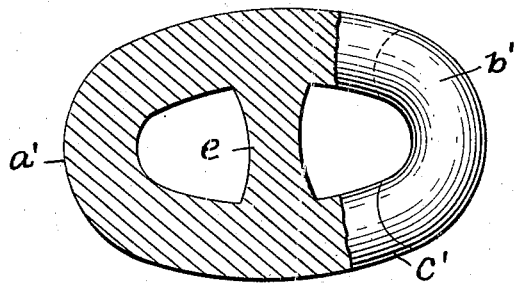

Fig. 3, a part sectional and a part plan view of a modified form of blank.

In making the link blanks I preferably employ a suitable mixture of cast steel having the desired carbon content and proceed in the manner usually followed in making a certain class of steel castings; that is to say, I preferably employ a two-part flask of any suitable type in which the mold cavities are formed to produce the link blank having, when cast, the configurations shown by the drawings.

As thus illustrated, the link blank comprises a loop portion $a$ and two separated curved end portions $b$ and $c$, the latter when separated each having a cross sectional area slightly in excess of one-half of the cross section of the finished link (see Fig. 2). Each of the end portions $b$ and $c$ is formed with an opposing face $d$.

These faces $d$ directly oppose each other whereby they may, without further manipulation of the blank, be welded together by pressure applied to the sides of the end portions. It will be understood that by forming the end portions and the faces thereof of the character described, I produce a blank being capable of being heated to welding heat and utilized without further manipulation, thereby greatly facilitating the manufacture of the link chain. Owing to the disposition of the parts as described, the separated ends may be readily brought together by subjecting said ends to the action of suitable apparatus, such for example, as a steam hammer.

In welding the ends I prefer to hammer the ends together, although they may be brought together while under a welding heat by pressure applied by other means to the sides of the separated ends.

In the form of my invention shown by Fig. 3 I cast the stud $e$ as an integral part of the link. In this latter form, the casting is substantially the same except that the end portions $b'$ and $c'$ are shorter than in the form of Fig. 1, and as stated, the stud is made as an integral portion of the link. In the form of Fig. 1, it is the intention to employ a separable stud, not shown, said stud being designed to be placed in position in the usual manner followed by chain manufacturers.

What I claim is:—

1. A chain link blank comprising a cast metal structure having curved separated end portions having opposing faces, said faces directly opposing each other whereby they may be welded together by pressure applied to the sides of the end portions.

2. A chain link blank comprising a cast metal structure including an integral stud and having curved separated end portions and opposing faces, said faces directly opposing each other whereby they may be welded together by pressure applied to the sides of the end portions.

In testimony whereof I affix my signature in presence of two witnesses.

WILLIAM R. CHILLCOTT.

Witnesses:
J. M. GEOGHEGAN,
LOIS WINEMAN.

Copies of this patent may be obtained for five cents each, by addressing the "Commissioner of Patents, Washington, D. C."